United States Patent [19]

Le Viet et al.

[11] Patent Number: 5,207,151
[45] Date of Patent: May 4, 1993

[54] APPARATUS FOR PASTEURIZING AND PRECOOKING PIZZA BASES

[75] Inventors: Toai Le Viet, Vevey; Eberhard Raetz, Corseaux, both of Switzerland

[73] Assignee: Nestec S.A., Vevey, Switzerland

[21] Appl. No.: 938,002

[22] Filed: Aug. 31, 1992

Related U.S. Application Data

[62] Division of Ser. No. 518,162, May 30, 1990, Pat. No. 5,149,556.

[30] Foreign Application Priority Data

May 22, 1989 [CH] Switzerland ............... 1920/89

[51] Int. Cl.$^5$ ............... A23L 3/01; H05B 6/78
[52] U.S. Cl. ............... 99/451; 99/386; 99/423; 99/443 C; 99/DIG. 14; 219/10.55 R; 219/10.55 A; 219/388
[58] Field of Search ............ 99/423, 373, 386, 443 C, 99/443 R, 451, DIG. 14; 219/10.55 R, 10.55 E, 10.55 A, 10.55 B, 10.55 F, 10.55 D, 10.55 M, 388; 426/521, 241, 243, 505, 523

[56] References Cited

U.S. PATENT DOCUMENTS

| | | |
|---|---|---|
| 3,790,748 | 2/1974 | Van Laethem et al. ............ 219/543 |
| 3,881,403 | 5/1975 | Ingram et al. . |
| 4,010,304 | 3/1977 | Cohen ............... 219/203 |
| 4,224,494 | 9/1980 | Reboux et al. ............ 219/9.5 |
| 4,367,243 | 1/1983 | Brummett et al. . |
| 4,439,656 | 3/1984 | Peleg . |
| 4,591,333 | 5/1986 | Henke ............... 99/386 |
| 4,624,854 | 11/1986 | Naumann et al. . |
| 4,631,029 | 12/1986 | Lanham et al. ............... 99/443 C |
| 4,687,895 | 8/1987 | Chitre et al. . |
| 4,818,831 | 4/1989 | Seaborne . |
| 4,839,485 | 6/1989 | Koch et al. ............... 219/10.55 A |
| 4,904,835 | 2/1990 | Koch et al. ............... 99/451 |
| 4,923,704 | 5/1990 | Levinson . |
| 4,962,298 | 10/1990 | Ferrari et al. ............... 99/DIG. 14 |
| 5,049,711 | 9/1991 | August ............... 219/10.55 A |
| 5,155,338 | 10/1992 | Hoffmann ............... 219/453 |
| 5,160,819 | 11/1992 | Ball et al. ............... 99/451 |

FOREIGN PATENT DOCUMENTS

| | | |
|---|---|---|
| 1026103 | 4/1953 | France . |
| 2398459 | 2/1979 | France . |
| 2612033 | 9/1988 | France . |
| 2097639 | 11/1982 | United Kingdom . |

OTHER PUBLICATIONS

European Search Report for CH 1920/89, dated Mar. 1990.

Primary Examiner—Timothy F. Simone
Attorney, Agent, or Firm—Vogt & O'Donnell

[57] ABSTRACT

An apparatus for pasteurizing and precooking pizza bases includes a conveyor belt having an upstream end and a downstream end, a plurality of vitroceramic plates attached to the conveyor belt, and a microwave tunnel positioned for heating vitroceramic plates conveyed through the microwave tunnel. Downstream of the microwave tunnel, pizza bases are delivered to the heated vitro- ceramic plates and they transported in contact with the heated plates to pasteurize and precook the pizza bases.

12 Claims, 1 Drawing Sheet

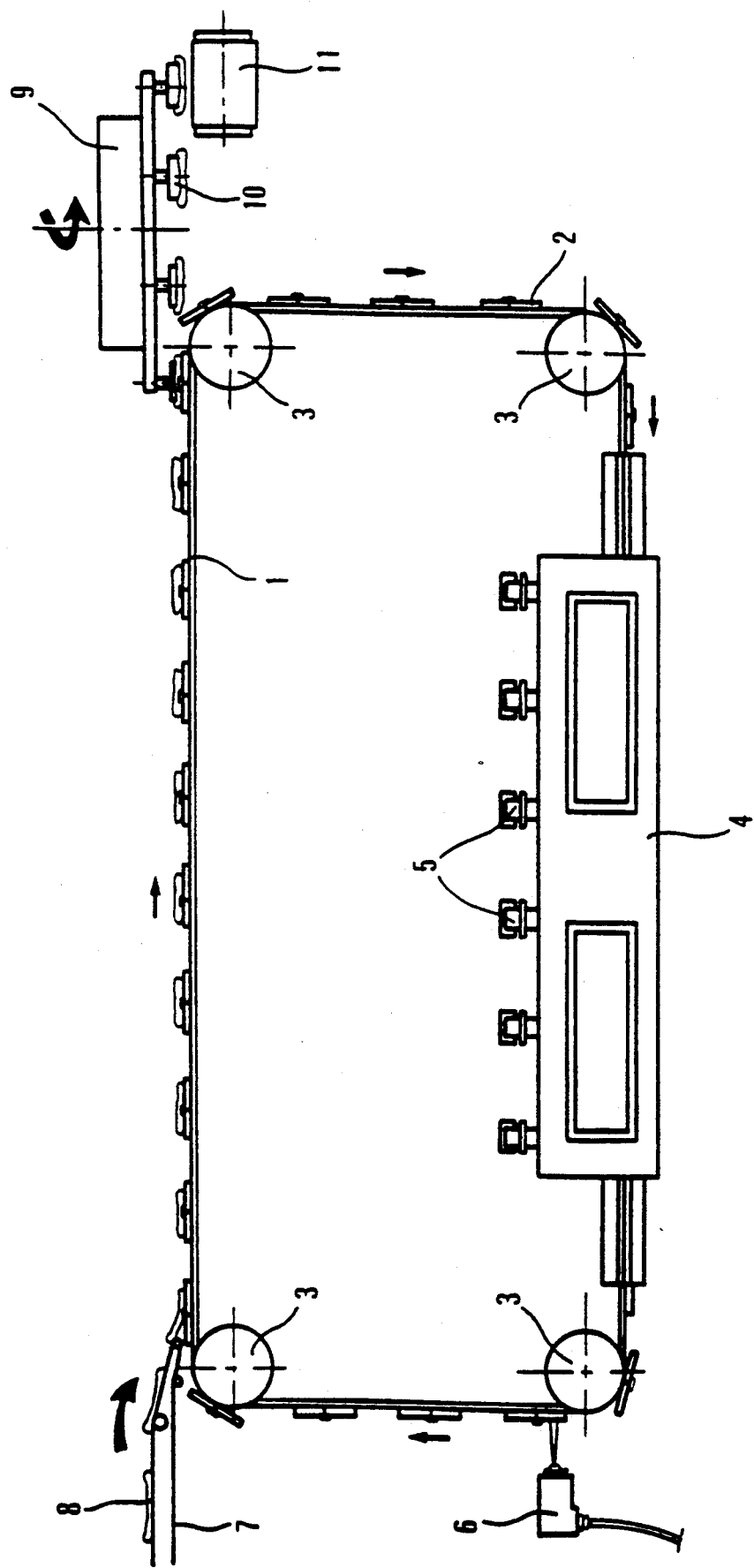

APPARATUS FOR PASTEURIZING AND PRECOOKING PIZZA BASES

CROSS REFERENCE TO RELATED APPLICATION

This is a divisional application of a application Ser. No. 07/518,162, filed May 30, 1990, U.S. Pat. No. 5,149,556.

BACKGROUND OF THE INVENTION

This invention relates to a process for pasteurizing and precooking raw (or uncooked) pizza bases. The invention also relates to an arrangement for carrying out this process.

To cook deep-frozen pizzas, the consumer may be presented with two possibilities. The first comprises filling a raw pizza base, freezing the pizza and cooking it before eating. The problem with non-precooked pizzas is that commercially available domestic ovens rarely permit correct, i.e., adequate, cooking of the pizzas because they generally do not enable temperatures high enough for proper cooking of the pizza dough to be reached. On the other hand, because the pizzas are only cooked once, there is no risk of the dough drying out.

To avoid the above-mentioned problem of inadequate cooking, the raw dough is generally precooked at the factory in conventional ovens applying convection and contact heat which has the disadvantage of drying particularly the edges of the dough not covered by filling or sauce. This phenomenon is further aggravated when the pizza is cooked for the second time during final preparation in a domestic oven.

SUMMARY OF THE INVENTION

The object of the present invention is partly to precook a pizza base with a temperature gradient in the dough which enables a product of satisfactory quality to be obtained during final cooking in a domestic oven while, at the same time, avoiding excessive evaporation of water from the dough which would result in drying out of the edges not covered by the filling or the sauce. In addition, the present invention allows satisfactory pasteurization for distribution of the pizza by refrigerated transport.

The present invention includes an apparatus for pasteurizing and precooking pizza bases which comprises a conveyor belt having an upstream end and a downstream end, a plurality of vitroceramic plates attached to the conveyor belt, a microwave tunnel positioned for heating vitroceramic plates conveyed through the microwave tunnel, and means positioned downstream of the microwave tunnel for delivering pizza bases to heated vitroceramic plates. The apparatus may include means positioned downstream of the microwave tunnel for removing pasteurized and precooked pizza bases from the vitroceramic plates. In operation, the conveyor belt transports the vitroceramic plates to and through the microwave tunnel so that the plates are heated. Pizza bases are then delivered to the heated plates and transported in contact with the heated plates to pasteurize and precook the pizza bases.

The present invention also relates to a process for pasteurizing and precooking raw pizza bases in which a vitroceramic plate is heated by microwaves to bring it to a temperature of 250° to 300° C., the plate is then removed from the microwave field and the pizza base is placed on the plate for about 2 to 3 minutes, and then the pasteurized and precooked pizza base is removed from the plate.

DETAILED DESCRIPTION OF THE INVENTION

According to the invention, the pizza base is precooked solely by underneath contact in a cold atmosphere.

The vitroceramic plate used must have a high absorption capacity for microwaves, i.e., it must enable the desired temperature to be reached in a short time. In addition, the vitroceramic plate used must have a high energy transfer coefficient. Plates of the CERAN type (Schott) or the PYROCERAM type (Dow Corning) are preferably used. These plates contain iron oxides and/or carbon fibers. They may of course contain other metal oxides which absorb microwaves.

If the pizza bases are left on the preheated vitroceramic plates for between 2 and 3 minutes, the surface directly in contact with the plate turns brown and is precooked, assuming a crispy character. However, the second advantage of this residence time on the plate is that it enables the pizza base to be pasteurized. This is because, after the 2 or 3 minutes, the dough in direct contact with the plate reaches a temperature of approximately 200° C. while the upper surface of the pizza base is at a temperature of approximately 90° C. This corresponds to a good pasteurization temperature. The effect of the pasteurization is to stop the activity of the yeast. Experiments have shown that precooking in accordance with the invention enables the germ content to be reduced to an acceptable level for a pasteurized product.

Accordingly, several uses may be envisaged for the pizza base thus treated. Thus, it may be filled, frozen and packed, which gives a precooked product useable with a standard pack which may then be cooked by the consumer in a conventional or microwave oven. Alternatively, it may be used without a filling in so-called fast-food catering. It is also possible to fill the pizza base intended for sale as a refrigerated product. Since the pizza thus obtained is pasteurized, it will keep for a fortnight in a refrigerator.

In one preferred embodiment of the process according to the invention, the vitroceramic plate is heated to between 270° and 280° C. and, after removal of the plate from the microwave field, the pizza base is placed thereon for about 2.5 minutes.

The pizza dough is prepared in the conventional manner with flour, water and yeast.

The power output of the oven used to heat the vitroceramic plates is not critical, although an oven having a power output of 5 KWatts with several microwave generators is preferably used.

The invention also relates to an arrangement for carrying out the process, comprising a conveyor belt with a plurality of vitroceramic plates and with a zone in which it passes through a microwave tunnel and a zone in which it passes through open air. The microwave tunnel comprises between three and seven microwave generators each having an output of the order of 5 KWatts.

The conveyor belt circulates at a speed of 1 to 3 m/minute. A good precooking effect is obtained with a vitroceramic plate having a thickness of 4 to 10 mm and preferably of the order of 8 mm. By means of this arrangement, precooked pizza bases can be continuously prepared and are pasteurized without an oven.

It is thus possible to avoid the disadvantage attending the conventional pasteurization of dough, namely its excessive expansion when it is in a hot oven.

The invention is described in more detail in the following with reference to the accompanying drawing which diagrammatically illustrates the arrangement according to the invention.

BRIEF DESCRIPTION OF THE DRAWINGS

FIG. 1 is a schematic depiction of an apparatus of the present invention.

DETAILED DESCRIPTION OF THE DRAWINGS

The conveyor belt (1) comprises vitroceramic plates (2) and circulates in a closed loop in the arrowed direction around reversing rollers (3). The microwave tunnel (4) comprises six microwave generators (5). At the exit of the microwave tunnel there is an infrared thermometer (6).

In operation, the microwave generators are switched on together with the conveyor belt which, initially, is empty. When the thermometer (6) detects a temperature of the order of 270° C.–280° C. on the vitroceramic plates, the conveyor belt (7) begins to circulate and brings the raw pizza bases (8) onto the vitroceramic plates. Precooking takes place in the section between the two successive reversing rollers (3). At the end of that section, a carousel (9) in the form of circular plates (10) removes the pizza bases and transfers them to the conveyor belt (11) for filling, packaging and freezing.

We claim:

1. An apparatus for pasteurizing and precooking pizza bases comprising:
   a conveyor belt having an upstream end and a downstream end;
   a plurality of vitroceramic plates attached to the conveyor belt;
   a microwave tunnel positioned for heating vitroceramic plates conveyed through the microwave tunnel; and
   means positioned downstream of the microwave tunnel for delivering a pizza base to a heated vitroceramic plate.

2. An apparatus according to claim 1 further comprising a thermometer positioned between the microwave tunnel and the means for delivering pizza bases for measuring the temperature of heated plates.

3. An apparatus according to claim 1 further comprising means positioned downstream of the means for delivering a pizza base for removing a precooked and pasteurized pizza base from a vitroceramic plate.

4. An apparatus according to claim 3 wherein the microwave tunnel is positioned about a lower run, but not an upper run, of the conveyor belt.

5. An apparatus according to claim 4 wherein the means for delivering pizza bases is positioned adjacent an upstream end of the upper run of the conveyor belt.

6. An apparatus according to claim 5 wherein the means for delivering the pizza bases comprises a second conveyor belt.

7. An apparatus according to claim 4 wherein the means for removing pizza bases is positioned adjacent a downstream end of the upper run of the conveyor belt.

8. An apparatus according to claim 7 wherein the means for removing pizza bases comprises a carousel in the form of circular plates.

9. An apparatus according to claim 1 wherein, in operation, the vitroceramic plates are heated by the microwave tunnel to a temperature of from 250° C. to 300° C. before the pizza base is delivered to the plate.

10. An apparatus according to claim 1 wherein, in operation, the conveyor belt transports the pizza bases in contact with the heated vitroceramic plates for from 2 minutes to 3 minutes to precook and pasteurize the pizza bases.

11. An apparatus according to claim 1 wherein the vitroceramic plates have a thickness of from 4 cm to 10 cm.

12. An apparatus according to claim 1 wherein the vitroceramic plates contain iron oxides, carbon fibers or a mixture of iron oxides and carbon fibers.

* * * * *

UNITED STATES PATENT AND TRADEMARK OFFICE
CERTIFICATE OF CORRECTION

PATENT NO. : 5,207,151
DATED : May 4, 1993
INVENTOR(S) : Toai LE VIET, et al.

It is certified that error appears in the above-identified patent and that said Letters Patent is hereby corrected as shown below:

On the title page, under the heading Related U.S. Application Data, item [62], "May 30, 1990" should be --May 3, 1990--.

Column 1, line 8, " May 30, 1990" should be --May 3, 1990--.

Signed and Sealed this

First Day of February, 1994

*Attest:*

BRUCE LEHMAN

*Attesting Officer*      *Commissioner of Patents and Trademarks*